United States Patent Office 2,926,078
Patented Feb. 23, 1960

2,926,078

METHOD FOR THE CONTROL OF THE GROWTH OF VEGETATION

Melvin J. Josephs, Midland, Mich.

No Drawing. Application December 3, 1956
Serial No. 625,587

5 Claims. (Cl. 71—2.3)

This invention is concerned with the suppression of the growth of undesirable vegetation and is particularly directed to a composition and method for the control of the growth of the germinant seeds, emerging seedlings and established plants of many weed species.

It is an object of the present invention to provide a new and improved method for the suppression and control of the growth of undesirable vegetation. Another object is to provide a method for the control of the growth of germinant seeds, emerging seedlings and established plants of many undesirable weed species. A further object is to provide a method for the suppression of the growth of germinant seeds and emerging seedings and particularly those of undesirable narrow leaved and broad leaved plants in soil or other growth media which is planted with corn. Another object is the provision of a method for the control of vegetative growth which requires the employment of small amounts of toxicant compound. Another object is the provision of a novel composition adapted to be employed for the accomplishment of the new method of growth control. An additional object is the provision of a method wherein a single soil application gives a very desirable residual control of plant growth and permits the treated soil to be planted and cropped during the same growing season in which the treatment is carried out. Other objects will become apparent from the following specification and claims.

According to the present invention, it has been discovered that the growth of plants may be controlled by exposing a part of the growing plant to the action of 2,3,6-trichlorobenzyl alcohol. More particularly, it has been discovered that the growth of the germinant seeds, emerging seedlings and established vegetation of many narrow leaved and broad leaved plants may be suppressed by exposing the germinant seeds, emerging seedlings or above-ground portions of established vegetation to the action of said compound. 2,3,6-trichlorobenzyl alcohol is a crystalline solid melting at 67°–68° C. and having the following formula:

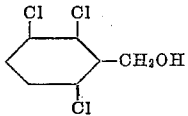

The compound is somewhat soluble in many organic solvents and of very low solubility in water. It has been found to have a high degree of toxicity to many plants and plant parts and is adapted to accomplish good controls of growth at very low concentrations of toxicant compound. A particular advantage of the present invention is that trichlorobenzyl alcohol has a low toxicity to the seeds and emerging seedlings of corn. Thus, it may be employed for the selective control of the germinant seeds and emerging seedlings of many narrow leaved and broad leaved plants in growth media planted with corn. Furthermore, 2,3,6-trichlorobenzyl alcohol has a high degree of persistency in soil and gives excellent controls of many undesirable broad and narrow leaved plant species for periods ranging up to several months.

The exposure of plants to the action of 2,3,6-trichlorobenzyl alcohol gives rise to varying degrees of response in germinant seeds, emerging seedlings and growing plants depending upon the form and nature of the plant part contacted, the stage of growth or maturity of the plant and the dosage of the toxicant compound employed. When extremely large dosages are dispersed in soil, a persistent inhibition of the growth of seeds, emerging seedlings and established plants is obtained. The growth media is possibly freed of the toxicant by the weathering action of the sun, the rain and perhaps the decomposition of the toxicant by the action of microorganisms. Soil applications of more dilute dosages suppress the growth of the seeds of many narrow and broad leaved plant species while having little or no effect upon the seeds and emerging seedlings of corn. Thus, it is possible to effect a selective treatment of mixed seedlings of many narrow and broad leaved plants in corn. The application of the alcohol compound to the foliage of many broad and narrow leaved plants suppresses the growth of the treated plants and effects a substantial denuding of the soil.

The exposure of the plant or plant part of the action of a growth inhibiting amount of 2,3,6-trichlorobenzyl alcohol is essential and critical for the practice of the present invention. In foliar treatments for the control of vegetative growth, good results are obtained when 5 or more pounds of the alcohol compound are applied per acre. In non-selective applications to soil for the control of germinant seeds, emerging seedlings and established vegetation, good results are obtained when the toxicant compound is distributed in the soil at a concentration of from about 2 to 150 parts or more by weight per million parts by weight of soil. In such applications it is desirable that the compounds be distributed to a depth of at least one-half inch and preferably at a dosage of at least about 1.0 pound per acre inch of soil. In selective applications for the control of the germinant seeds and emerging seedlings of many broad and narrow leaved plants in areas planted with corn seeds, a dosage of from 2 to 30 parts by weight of the alcohol compound per million parts by weight of soil may be employed.

The method of the present invention may be carried out by applying to the growth media or upon the surfaces of the above-ground portions of plants the unmodified 2,3,6-trichlorobenzyl alcohol compound. However, the present method also embraces the employment of a liquid or dust composition containing said compound. In such usage, the compound may be modified with one or a plurality of additaments or herbicide adjuvants such as water, petroleum distillates or other liquid carriers; surface-active dispersing agents; and finely divided inert solids. Depending upon the concentration of the toxicant, such augmenting compositions are adapted to be distributed in the soil or upon the above-ground surfaces of plants, or employed as concentrates and subsequently diluted with additional inert carrier to produce the ultimate treating compositions.

The exact concentration of the 2,3,6-trichlorobenzyl alcohol compound to be employed in the treating composition is not critical and may vary considerably provided the required dosage of effective agent is supplied in the growth medium or upon the plant foliage. The concentration of toxicant in organic solvent compositions employed to supply the desired dosage is generally from about 10 to 85 percent by weight. With aqueous compositions, the required dosage is generally supplied with compositions containing 0.2 to 50 percent by weight, although concentrations of 0.0002 percent by weight conveniently may be employed in irrigation treatments of soil. In dusts, the concentration of toxicant may be from 1 to 50 percent by weight, although concentrations as low as 0.1 percent by weight are sometimes employed. In compositions to be employed as concentrates, the toxicant oftentimes is present in a concentration of from 5 to 95 percent by weight.

The quantity of treating composition to be applied may vary considerably provided that the required dosage of active ingredient is applied in sufficient of the finished composition to cover adequately the vegetation to be treated or to facilitate the penetration and distribution of said ingredient in growth media. The required amount of the active ingredient in the soil conveniently may be supplied per acre treated in from 10 to 27,000 U.S. gallons or more of the liquid carrier or in from 50 to 2,000 pounds of the inert solid carrier in the treatment of seedling weeds. Good coverage is obtained when using from 10 to 60 U.S. gallons of finished spray composition per acre. Where large succulent vegetation is concerned, it is frequently desirable to employ up to 250 U.S. gallons or more of the finished spray composition per acre to assure complete coverage of the above-ground portion of the vegetation. In the application of dusts to plant foliage, good results are obtained with from 40 to 200 pounds of finished dust per acre, the only requirement being that the required toxicant dosage be supplied in sufficient dust to achieve good coverage of the foliage.

Liquid compositions containing the desired amount of the 2,3,6-trichlorobenzyl alcohol compound may be prepared by dispersing the toxicant in an organic liquid or by dispersing the toxicants in water with the aid of a suitable surface-active dispersing agent such as an ionic or non-ionic emulsifying agent. Suitable organic liquid carriers include the agricultural spray oils and the petroleum distillates such as diesel fuel, kerosene, fuel oil, naphthas and Stoddard solvent. Among the latter, the petroleum distillates boiling almost entirely under 400° F. at atmospheric pressure and having a flash point above 80° F. are generally preferred. The aqueous compositions may contain one or more water-immiscible solvents for the 2,3,6-trichlorobenzyl alcohol compound. In such compositions, the carrier comprises an aqueous emulsion, that is, a mixture of water-immiscible solvent, emulsifying agent and water. The choice of dispersing and emulsifying agent and the amount thereof employed are dictated by the nature of the composition type and by the ability of the agent to facilitate the dispersion of the compound in the aqueous carrier to produce the desired composition. The surface-active agents are generally employed in the amount of from 1 to 20 percent by weight of the alcohol compound. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the 2,3,6-trichlorobenzyl alcohol compound is dispersed in and on a finely divided inert solid such as talc, chalk, gypsum and the like. In such operations, the carrier is mechanically ground with the compound or with a volatile organic solvent solution thereof. Similarly, dust compositions containing the compound may be prepared from various solid surface-active dispersing agents such as bentonite, fuller's earth, attapulgite and other clays. Depending upon the proportions of ingredients, these dust compositions may be employed as concentrates and subsequently diluted with additional solid surface-active dispersing agents or with talc, chalk, gypsum and the like to obtain the desired amount of active ingredient in a composition adapted to be applied for the control of the growth of vegetation. Also, such concentrate dust compositions may be dispersed in water with or without the aid of a dispersing agent to form spray mixtures.

When operating in accordance with the present invention, growth inhibiting amounts of the compound or a composition containing the toxicant are dispersed in any convenient fashion in soil or other growth media, i.e., by simple mixing with the growth media, by applying to the surface of soil and thereafter dragging or disking into the soil to the desired depth, by injection or drilling techniques whereby the toxicant is deposited beneath the surface of the soil or by employed a liquid carrier to accomplish the penetration and impregnation. The application of the spray and dust compositions to the surface of soil or to the above-ground surfaces of plants may be carried out by conventional methods, for example, with power dusters, boom or hand sprayers and spray dusters.

In a further method, the distribution of the 2,3,6-trichlorobenzyl alcohol in soil may be accomplished by introducing the toxicant in the water employed to irrigate the soil. In such procedure, the amount of water may be varied in accordance with the porosity and water-holding capacity of the soil in order to obtain the desired depth of distribution of the toxicant.

The following examples illustrate the invention but are not to be construed as a limitation thereof:

*Example 1*

25 parts by weight of 2,3,6-trichlorobenzyl alcohol, 10 parts of a dimeric alkylated aryl polyether alcohol (Triton X–155) and 65 parts of naphtha are mixed together to prepare a concentrate composition in the form of an emulsifiable liquid.

In a similar manner, 25 parts by weight of 2,3,6-trichlorobenzyl alcohol, 72 parts of diatomaceous earth, 2 parts of an alkyl aryl sulfonate (Nacconal NR) and 2 parts of a polymerized sodium salt of a substituted benzoic alkyl sulfonic acid (Daxad No. 27) are mechanically mixed and ground together to prepare a concentrate composition in the form of a wettable powder.

Also, a mixture of 20 parts by weight of 2,3,6-trichlorobenzyl alcohol, 0.1 part of Nacconal NR, 0.1 part of Daxad No. 27 and 200 parts of water are ball milled together to prepare a water-dispersible concentrate composition.

These concentrate compositions are adapted to be dispersed in water to prepare aqueous compositions having very desirable wetting and penetrating properties. The latter aqueous compositions are adapted to be employed to distribute growth inhibiting dosages of the alcohol compound in soil or upon the above-ground surfaces of plants.

*Example 2*

25 parts by weight of 2,3,6-trichlorobenzyl alcohol, 10 parts of Triton X–155 and 65 parts of xylene were mechanically mixed together to produce a concentrate composition in the form of an emulsifiable liquid. A portion of this concentrate composition was dispersed in water to prepare an aqueous emulsion composition containing 0.051 gram of the alcohol compound per liter of ultimate mixture. This composition was employed for the treatment of soil and observations made of the control of the growth of the seeds and emerging seedlings of various plant species. The plant species included German millet, morning glory, crabgrass and corn. In the determinations, the composition was employed to treat soil areas which had been prepared and seeded with the named plant species. In the treating operations, the composition was applied as a soil drench and at a rate of 0.43 acre inch of composition per acre to supply a substantially uniform dosage of 5 pounds of the alcohol compound per acre. This dosage corresponds to a concentration of about 8.2 parts by weight of 2,3,6-trichlorobenzyl alcohol per million parts by weight of soil. Other areas similarly seeded with the named plant species were left untreated to serve as checks.

After 3 weeks, the treated areas were examined to ascertain what control of the growth of the seeds and emerging seedlings had been obtained. The results are set forth in the following table.

| Seed Species | Percent Control of Growth of Seeds and Emerging Seedlings at a Dosage of 5 Pounds of Toxicant per Acre |
|---|---|
| German Millet | 98 |
| Morning Glory | 95 |
| Crabgrass | 98 |
| Corn | 10 |

At the time of observation, the check areas were found to support vigorously growing stands of all the named plant species.

*Example 3*

The emulsifiable liquid concentrate composition as prepared in Example 1 was dispersed in water to prepare an aqueous emulsion composition containing 0.204 gram of 2,3,6-trichlorobenzyl alcohol per liter of ultimate mixture. This composition was employed for the treatment of soil and observations made of the control of the growth of seeds and emerging seedlings of various plant species. The plant species included soybeans, Japanese millet, wild oats, radish and sorghum. In the determinations, the composition was employed to treat soil areas which had been prepared and seeded with the named plant species. In the treating operations, the composition was applied as a soil drench and at a rate of 0.43 acre inch of composition per acre to supply a substantially uniform dosage of 20 pounds of the alcohol compound per acre. This dosage corresponds to a concentration of about 33 parts by weight of 2,3,6-tricholorobenzyl alcohol per million parts by weight of soil. Other areas similarly seeded with the named plant species were left untreated to serve as checks.

After 3 weeks, the treated areas were examined to ascertain the control of the growth of the seeds and emerging seedlings. The results are set forth in the following table.

| Seed Species | Percent Control of Growth of Seeds and Emerging Seedlings at a Dosage of 20 Pounds of Toxicant per Acre |
|---|---|
| Soybeans | 100 |
| Japanese Millet | 90 |
| Wild Oats | 80 |
| Radish | 100 |
| Sorghum | 98 |

At the time of the observations, the check areas were found to support abundant and vigorously growing stands of all the named plant species.

*Example 4*

The emulsifiable liquid concentrate composition prepared in Example 1 was dispersed in water to prepare an aqueous emulsion composition containing 4,000 parts by weight of 2,3,6-trichlorobenzyl alcohol per million parts of ultimate mixture. This composition was applied to the foliage of seedling stands of Japanese millet, German millet, morning glory and crabgrass which were from 2 to 5 inches tall. In the treating operations, the composition was applied with a conventional sprayer at 40 pounds per square inch pressure and at a dosage of about 15 pounds of toxicant per acre. Other stands of the named plant species were left untreated to serve as checks.

Ten days following the applications, the stands were examined to ascertain the percent control of growth of the various plant species. The results are set forth in the following table.

| Plant Species | Percent Control |
|---|---|
| Japanese Millet | 85 |
| German Millet | 95 |
| Morning Glory | 75 |
| Crabgrass | 95 |

At the time of observation, the untreated check plots showed vigorously growing stands of each named species.

The expressions "growth media" and "soil" are employed in the present specification and claims in their broadest sense to be inclusive of all conventional "soils" as defined in Webster's New International Dictionary, Second Edition, Unabridged, published in 1937 by G. and C. Merriam Company, Springfield, Massachusetts. Thus, the term refers to any substances or media in which vegetation may take root and grow and is intended to include not only earth but also compost, manure, muck, humus, sand and the like adapted to support plant growth. The term "plant part" as employed in the present specification and claims is intended to be inclusive of the stems, branches, roots, foliage, and germinant seeds of plants.

I claim:

1. A method for the selective suppression of the germinant seeds and emerging seedlings of undesirable narrow leaved and broad leaved weeds in soil planted with corn which comprises distributing 2,3,6-trichlorobenzyl alcohol in such soil in the amount of from 2 to 30 parts by weight per million parts by weight of soil.

2. A method for the suppression of the growth of plants which comprises contacting growing plants and plant parts with a growth inhibiting amount of an aqueous dispersion of a composition containing from 80 to 99 percent by weight of 2,3,6-trichlorobenzyl alcohol in intimate admixture with an emulsifying and dispersing agent, said aqueous dispersion containing at least 0.0002 percent by weight of 2,3,6-trichlorobenzyl alcohol.

3. A method for the suppression of the growth of plants which comprises contacting growing plants and plant parts with a growth inhibiting amount of 2,3,6-trichlorobenzyl alcohol.

4. A method for the suppression of the growth of plants which comprises impregnating soil with a growth inhibiting amount of 2,3,6-trichlorobenzyl alcohol.

5. A method for the suppression of the growth of plants which comprises impregnating soil with a growth inhibiting amount of a composition comprising 2,3,6-trichlorobenzyl alcohol as an active ingredient in intimate admixture with an inert herbicide adjuvant as a carrier therefor.

References Cited in the file of this patent

UNITED STATES PATENTS 1,514,377   Dow et al. _____ Nov. 4, 1924

OTHER REFERENCES

Frear: "A Catalogue of Insecticides and Fungicides," 1947, vol. 1, page 125.

King: U.S. Dept. Agri. Handbook No. 69, May 1954, page 82.

Ciamician et al. in "Chemical Abstracts," vol. 12, page 1307(8), 1918.

Bergman et al. in "Chemical Abstracts," vol. 45, col. 5125(a), 1951.

UNITED STATES PATENT OFFICE
CERTIFICATE OF CORRECTION

Patent No. 2,926,078                     February 23, 1960

Melvin J. Josephs

It is hereby certified that error appears in the above numbered patent requiring correction and that the said Letters Patent should read as corrected below.

In the grant, lines 1 to 3, for "Melvin J. Josephs, of Midland, Michigan," read -- Melvin J. Josephs, of Midland, Michigan, assignor to The Dow Chemical Company, of Midland, Michigan, a corporation of Delaware, --; line 12, for "Melvin J. Josephs, his heirs" read -- The Dow Chemical Company, its successors --; in the heading to the printed specification, line 4, for "Melvin J. Josephs, Midland, Mich." read -- Melvin J. Josephs, Midland, Mich., assignor to The Dow Chemical Company, Midland, Mich., a corporation of Delaware --.

Signed and sealed this 4th day of October 1960.

(SEAL)
Attest:

KARL H. AXLINE
Attesting Officer

ROBERT C. WATSON
Commissioner of Patents